April 13, 1954
L. J. MARNAY
2,675,196
JET PROPULSION ENGINE FOR AIRCRAFT
Filed June 9, 1948
3 Sheets-Sheet 1
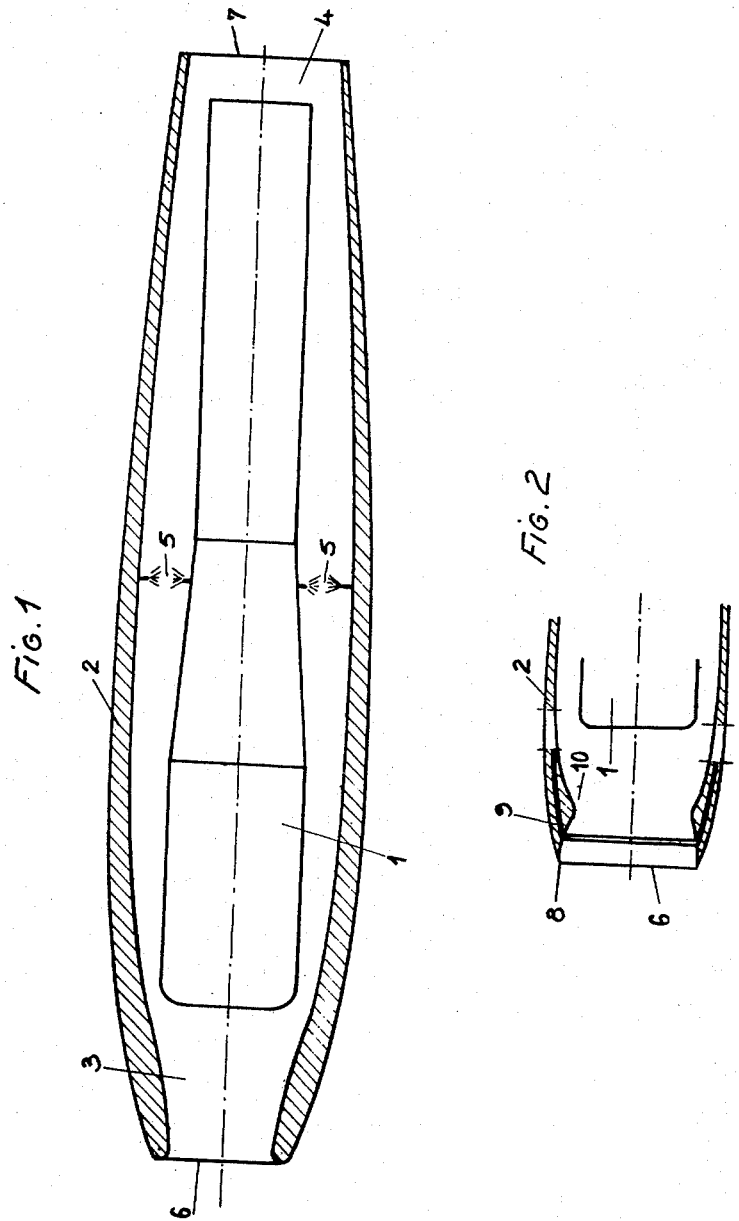
INVENTOR
LOUIS J. MARNAY
By Haseltine, Lake & Co.
AGENTS

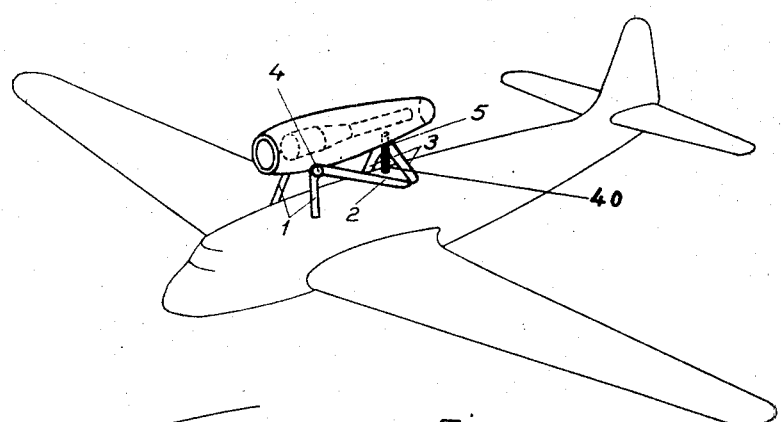
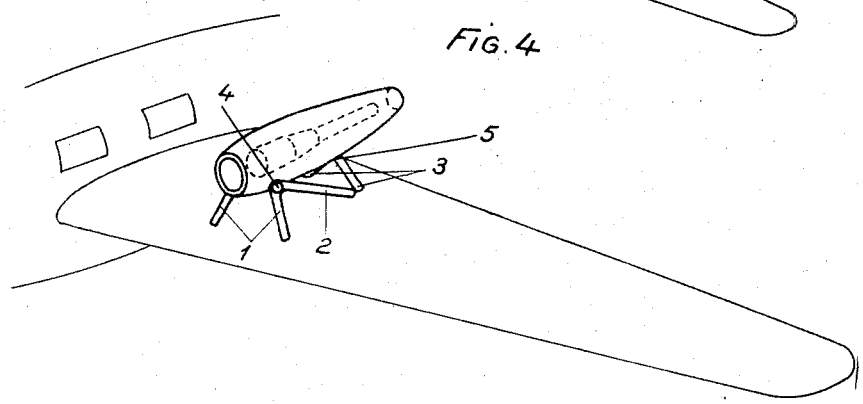
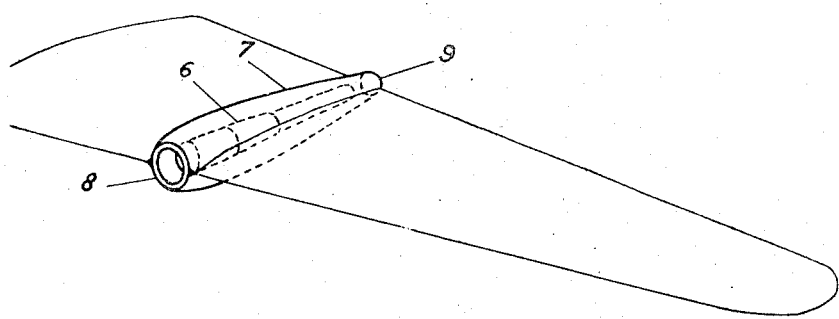

April 13, 1954            L. J. MARNAY            2,675,196
JET PROPULSION ENGINE FOR AIRCRAFT
Filed June 9, 1948            3 Sheets-Sheet 3
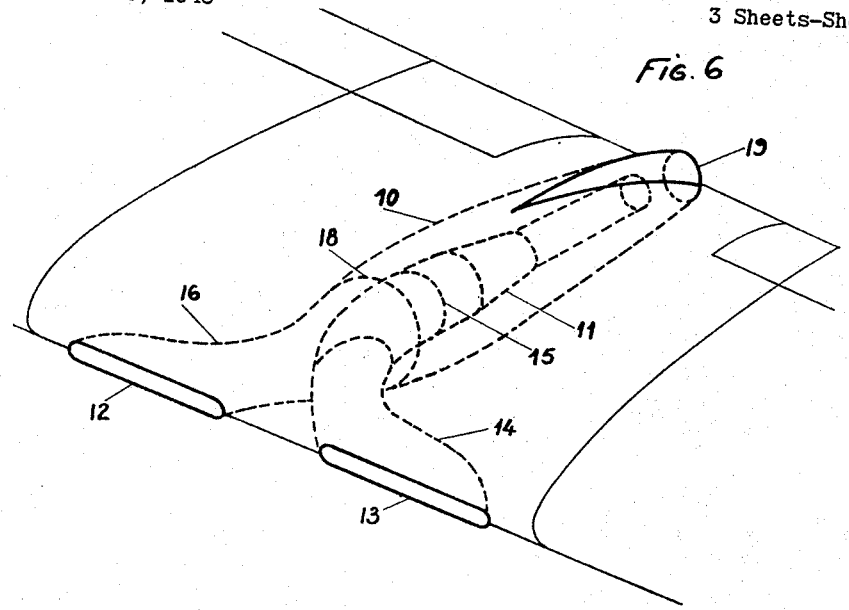
Fig. 6
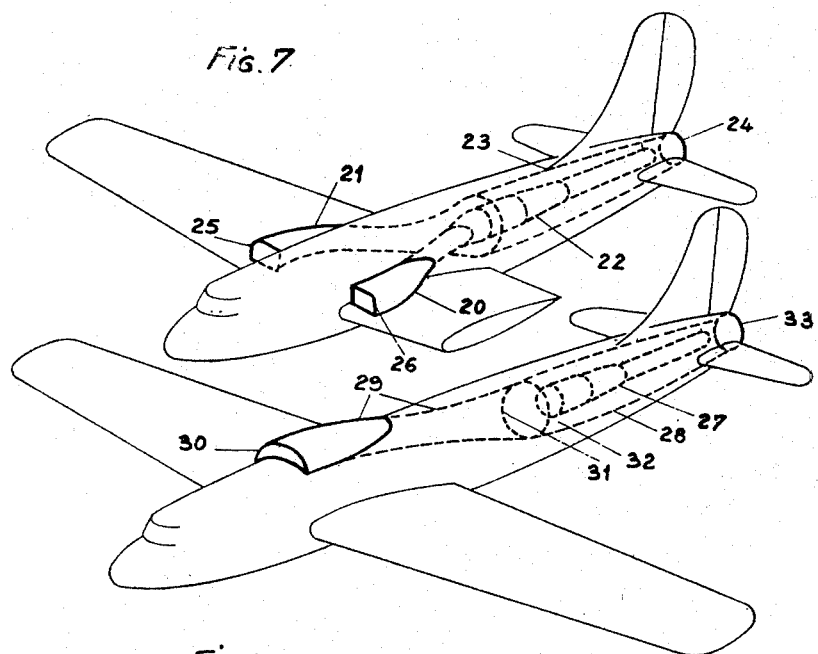
Fig. 7
Fig. 8
INVENTOR
LOUIS J. MARNAY
BY Haseltine, Lake & Co.
AGENTS Patented Apr. 13, 1954

2,675,196

UNITED STATES PATENT OFFICE 2,675,196

JET PROPULSION ENGINE FOR AIRCRAFT

Louis Jules Marnay, Beziers, France, assignor to Société Nationale de Constructions Aéronautiques du Sud-Est, Paris, France Application June 9, 1948, Serial No. 31,915

Claims priority, application France June 30, 1947

7 Claims. (Cl. 244—74)

This invention has for main object to provide a jet propulsion unit which comprises in combination a pulse-jet motor and a ram-jet motor arranged one within the other.

The advantages of such a combined propulsion unit will differ according to the uses for which it is intended. It is well-known that a pulse-jet motor and a ram-jet motor when used singly are not suited to identical conditions of use. Thus the efficiency factor of ram-jet motors does not reach a really advantageous value until relatively high speeds are attained, while that of a pulse-jet motor is quite satisfactory even for substantially lower speeds. It will thus be understood that the combination of both types of apparatus into a single unit will make it possible to provide a drive unit having a higher overall efficiency.

According to another object of the invention one of the jet motors is so constructed as to be adapted for normal speeds of operation, the other jet motor then assuming the status of an accessory merely serving to improve the efficiency factor or the conditions in which it is possible to reach the point of optimum operation of the first jet motor.

According to another object of the invention, both jet motors may alternatively be used in succession and simultaneously depending on the prevailing operative conditions, whereby the device of the invention may be satisfactorily employed in a great variety of conditions. Thus, in a particularly desirable form of embodiment of the invention, neither one of the jet motors is given a predominant status over the other one.

In an advantageous form of embodiment of the combined jet unit, the pulse-jet motor is arranged within the ram-jet motor and a faired or stream-lined form is imparted to the whole.

According to other objects of the invention, the improved combined jet unit may be arranged above or below the fuselage of an aircraft to which the invention is applied, or alternatively within said fuselage, or above or below the wing surfaces or it may be built in said wings.

Arrangement of the unit above or below or within the fuselage will be adopted in case a single drive unit is used in the aircraft, or for the intermediate unit where an odd number of drive units are used. Location of the units above or below the wings, or the built-in arrangement will preferably be selected where an even number of the improved reaction units are used. However in the last-mentioned case of an even number of units the arrangement of two or more of the units within the fuselage is also contemplated.

The above and other objects, features and advantages of the invention will appear in the course of the ensuing description made in reference with the accompanying drawings, given by way of illustration and not of limitation of the scope of the invention, and wherein;

Fig. 1 is an axial longitudinal cross-section of a combined jet unit according to the invention;

Fig. 2 similarly illustrates a modification of the front part of the unit;

Fig. 3 is a diagrammatic perspective view of an improved drive-unit arranged over the fuselage of an aircraft;

Fig. 4 is a perspective view of a unit mounted over the wing of an aircraft;

Fig. 5 is a diagrammatic perspective view of the built-in arrangement of a jet unit according to the invention in the wing of an aircraft;

Fig. 6 is a diagrammatic perspective view on an enlarged scale of the built-in arrangement of an improved drive unit in an aircraft wing;

Figs. 7 and 8 diagrammatically illustrate in perspective two alternative arrangements of an improved jet unit within the fuselage of an aircraft.

In the form of embodiment shown in Fig. 1 the pulse-jet motor 1 is arranged within a fair-shaped structure or housing 2 of greater length than the pulse-jet motor 1, so that forwardly of the latter there is defined an inwardly-divergent chamber 3 while rearwardly of the said pulse-jet motor there is a chamber 4. The outer contour of the housing is so formed as to provide a highly stream-lined profile. Internally said housing is spaced from the walls of the pulse-jet motor 1, in such a way as to define therewith, from the front to the back end of the device, first a divergent duct effective to slow down the air drawn into said duct and place said air under compression, and thereafter a convergent duct adapted to accelerate the rate of flow of the gases so as to convert the internal energy thereof into momentum or kinetic energy.

At or near the point where said spacing or duct reaches its maximum cross-sectional area, in a preferred form of embodiment, burners 5 may be provided to thereby complete the ram-jet motor assembly formed in said annular duct.

Forwardly the housing is formed with an air-intake orifice 6 and rearwardly the gases after having flowed through the device issue from out of the housing through an outlet 7.

The air after having entered through the inlet 6 is compressed because of the increase in cross-sectional area within the chamber 3 then it flows both through the annular space defined between the housing 2 and the pulse-jet-motor 1 and through said pulse-jet-motor 1 itself.

The air flowing through the ram-jet unit is heated by radiation from the pulse-jet motor and the radiating heat therefrom is in this way partly recovered. The action of the ram-jet motor may be increased through burning at 5 additional amounts of fuel.

In the chamber 4 the hot gases issuing from the pulse-jet motor 1 before being exhausted to atmosphere mingle with the gases from the ram-jet motor. Such mingling of the gas streams is desirable because it makes it possible to increase the efficiency of the hotter jet through incorporating cooler gases thereto.

The structure as a whole further presents the following advantages, particularly noteworthy in actual practice. The drag resistance of the structure is minimized to the greatest posible extent. This is so because, if it were desired to obtain an acceptably low drag in using the pulse-jet motor alone, it would be necessary, in view of its general shape, to provide it with a fair-shaped housing having a maximum cross-section substantially equal to that of the housing required in the combination device forming the subject of this invention. Thus the drag characteristic of the pulse-jet motor alone would be nearly equal to that of the combination unit comprising the pulse-jet and the ram-jet motor, while the efficiency would be much lower; for the losses of energy through radiation which are unavoidable in a pulse-jet motor used separately are avoided with the use of a pulse-jet motor surrounded by a ram-jet motor. That is, the radiating heat from the pulse-jet motor heats the air flowing through the ram-jet motor unit and thus supplies an additional thrust component.

As previously stated the combined pulse-jet and ram-jet motors can be used in various ways. If it is the pulse-jet motor which is designed for the type of use considered, the adjunction of a stream lined housing according to the invention provides a means for increasing at the cost of low additional expense, both the aero-dynamic and the thermal efficiency of the system. Conversion of the kinetic energy of the incoming air into pressure is facilitated by the provision of the chamber at 3. The heat normally lost through radiation is herein put to use in the production of a thrust, and the efficiency of the jet is improved through the admixture in the chamber 4 of a substantial amount of cool air.

Because of the low efficiency of ram-jet motors at the lower speeds, it is obvious that the burners 5 will in use only be ignited after the aircraft has reached a speed sufficient to cause the efficiency thereof to be satisfactory.

In those embodiments wherein the higher speed ranges are attained at which the efficiency factor of the ram-jet motor is greater than that of the pulse-jet motor, greater relative importance is given to said ram-jet motor.

Consequently in aircraft designed to travel at high flying speeds the ram-jet motor will form the main drive apparatus, and it will even be possible to stop the operation of the pulse-jet motor after the normal flying speed has been reached. In such a form of construction the pulse-jet motor serves as a take-off aid.

It will of course be understood that the air-inlet 6 can be provided with any suitable air-intake adjusting means as requirements may dictate, such as an intake-adjusting cone, annulus or the like, and the issuing jet may be adjusted at its outlet or used in any suitable manner according to the particular application desired as through the use of an adjustable cone or the like. Also, the air inlet 6 and the form of the compression chamber 3 can be modified in accordance with the prevailing external conditions.

Thus, in particular in connection with flight in the supersonic range of speeds the contour of the inlet mouth 6 can be modified so as to provide for a maximum recovery of dynamic energy. For use at such speeds the air inlet may be formed with a sharp marginal edge, as shown at 8 in Fig. 2, and a throat portion or venturi 10 may be arranged at or slightly rearward of the point at which a leading shock-wave may occur. The flow only becomes subsonic in character to the rear of this wave. Finally between the sharp end 8 and the venturi 10 a take-off may be provided for drawing off the boundary layer.

The pulse-jet motor may be resiliently mounted on the aircraft so as to insure greater regularity in the transmission of the thrust. Transmission to the wings and the frame-work of the aircraft of the violent intermittent shocks of the kind normally produced in a pulse-jet motor is in this way averted.

In the forms of embodiment so far described and shown the fair-shaped housing is in the form of a surface of revolution. This however is by no means essential and said outer housing may be given any suitable external shape. Thus, the device of the invention may be mounted on a wing surface and it may be built-in or included within the structure of said wing, in which case the outer configuration of the housing is that of an aerofoil. The drive unit can then extend throughout a substantial portion of the wing-span, constituting a drive unit of flat or laterally-elongated shape. Fig. 1 of the drawing may thus be considered as representing a cross-section of a "driving wing" according to the invention.

It is one of the essential advantages of the invention that because of the substantial absence of any parts in motion, with the possible exception of the pulse-jet motor outlet valves the external shape of the device rather than being determined by the requirements of the propulsion unit are determined by the requirements of the aircraft in which said unit is arranged.

Where the jet engine of this invention is arranged above the fuselage of the aircraft it can advantageously be supported or secured to the fuselage as shown in Fig. 3, through assemblies of profiled bars 1 and 2 each forming an inverted V, said assemblies being arranged symmetrically on each side of the longitudinal center plane of the aircraft and being secured at the junction 4 of the branches of the V, to the jet unit on each side and at the front thereof, while the bars 3 supporting the unit at the rear also form an inverted V assembly extending in a plane transverse with respect to the longitudinal axis of the aircraft and are secured to the drive unit under the latter and in the longitudinal central plane of the aircraft. In a preferred embodiment the bars 3 are so constructed as to be expansible or so as to include at the point indicated at 5 which forms the junction or apex of the branches of the V a means such as the threaded part 40 which is adapted to slide with respect to each of the bars 3 and thus to alter the height of the apex 5 of the V with respect to the fuselage, thereby modifying the angle defined between the longitudinal axis of the jet unit and any selected reference line of the wings; in other words, so as to modify the positioning of the line of action along which the thrust generated by the jet unit is exerted, in relation to the angle of incidence of the wings. It is then desirable to provide at the foremost point of attachment 4 of the jet unit a pivotal connection between said unit and the bars 1 and 2, of any known and suitable type. The means provided at the connection 5 of the rearmost bars 3 of the supporting structure may also be of any suitable known type, and particularly of a type making it possible to control the extension of the rear support 3 from the interior of the aircraft, as from the pilot's cockpit.

In Fig. 4 there is shown an embodiment similar to that shown in Fig. 3 except that the jet unit is arranged above a wing of the aircraft rather than being above the fuselage.

Fig. 5 illustrates a built-in arrangement of the jet unit within the wing structure of the aircraft. 6 designates the pulse-jet motor arranged within the stream lined housing 7 of the ram-jet motor, 8 is the air-inlet formed in the leading edge of the wing and 9 is the rearwardly arranged gas outlet in the trailing edge of the wing.

Finally the jet device according to the invention can be arranged under the fuselage or under a wing. In that case a similar mounting or attaching device is used to that described by way of example in connection with Figs. 3 and 4, except that it is arranged to support the drive unit in depending relation from the aircraft rather than supporting it in overhead relation as above-described.

In the event where, in order to improve the airflow characteristics of the aircraft the jet units of the invention are arranged in built-in condition in deep wing-sections or in the fuselage, it is also possible, according to a desirable feature of this invention, to tap air from the most favorable point or points and convey it as far as the drive unit by way of an air-intake duct, and, more particularly convey it to the pulse-jet motor and the ram-jet motor respectively through two separate ducts.

Fig. 6 illustrates a form of embodiment of an improved jet unit built in a wing and provided with a pair of separate air-intake ducts, one of which leads the air to the pulse-jet motor and the other to the ram-jet motor. The circular stream lined housing 10 of the ram-jet motor centrally houses the pulse-jet motor 11, and the air take-off is effected from the leading edge of the wing as at 12 and 13. The duct 14 which supplies air to the pulse-jet motor is flattened in cross-sectional contour, merging with that of the intake orifice 13, then its shape gradually alters as it approaches the drive unit, to finally terminate in the cylindrical contour of the pulse-jet motor at 15. The duct 16 similarly starts with a flattened contour merging with that of the air take-off 12, then is gradually distorted so as also to end in a circular section after having surrounded the duct 14 and at the point where it merges with the circular outer housing 18 of the ram-jet motor. The longitudinal contour of the ducts, i. e. the variation of the cross-sectional area thereof along the ducts is so determined as to provide for a progressive compression of the air flowing therethrough, as previously described. According to a feature of the now-described modification of the invention, the previously described compression chamber formed at the forward end of the fair-shaped housing can then be omitted. 19 designates the gas outlet formed in the trailing edge of the wing.

Fig. 7 illustrates a modification of the invention wherein the jet unit is arranged within the fuselage of the aircraft. The intake of air is effected through two ducts, one of which, the duct 20 takes in air for instance at the left-hand side of the fuselage and leads it to the pulse-jet motor 22, while the other duct, 21, draws in the air from the right-hand side of the fuselage and conveys it to the ram-jet motor 23, the gases issuing from out of the jet unit through the outlet 24 at the very rearmost end of the fuselage.

Just as in the arrangement wherein the propulsion unit is built in the wing, the air-intake ducts 20 and 21 gradually change shape as they extend from the air inlets 25 and 26 so as to provide for the necessary compression of the air required for a proper operation of the device, all as described previously.

Fig. 8 illustrates an embodiment wherein the jet unit is again arranged within the fuselage of an aircraft, but wherein according to another feature both the pulse-jet motor 27 and the ram-jet motor 28 are supplied through a common intake duct 29 having its inlet 30 formed for instance at the top of the fuselage and conforming to the shape of the upper surface of said fuselage. As it extends into the fuselage the duct is progressively distorted in its cross-sectional contour so as to merge with the circular inlet 31 of the compression chamber 32 provided in front of the pulse-jet tube as described in connection with Fig. 1. The gases issue from the rear end of the unit which for that purpose comprises an outlet 33.

It will be understood of course that all the forms of embodiment described hereinabove in connection with the accompanying drawings have been given merely by way of example, and that without exceeding the scope of the invention various modifications may be made in the details of construction thereof, according to the methods used in installing and operating the device and the size of the aircraft. Thus for example the air-inlets could be spaced somewhat inwardly from the leading edge of the wing, and they could be located in the upper or the under wing surface, or on the upper or under surface of the fuselage, or both over and under the wings or the fuselage, or further they might be combined with air-intakes formed in the sides of the fuselage, both in the arrangement where the pulse-jet tube and the ram-jet motor are both supplied through a common duct, and in the arrangement where an independent supply duct is provided for each. Finally regardless of the location selected for the jet unit, the air supply may be effected through a combination of intakes some of which are arranged in the fuselage and some in the wings.

Similarly the outlet for the gases may be located elsewhere than at the extreme rear end of the fuselage or the trailing edge of the wings, at any point where the propulsive thrust will exert a favorable action upon the aircraft as a whole.

What I claim is:

1. In an aircraft, at least one propulsion unit each comprising a pulse-jet motor, means for supplying said motor with compressed air, an open stream-lined nacelle concentrically surrounding said motor while forming all round the same an annular duct extending in the fore-andaft direction of said aircraft, means for supplying said duct with compressed air, said duct forming successively an annular divergent-convergent chamber round said pulse-jet motor for increasing the thrust effect of the compressed air passing through said duct by means of the heating induced by the outer wall of said pulse-jet motor and a convergent chamber downstream of said pulse-jet motor for simultaneously expanding the compressed air heated within said duct and the exhaust gases of said motor and increasing the efficiency of the hotter gases by admixture of cooler gases, whereby said duct acts as a ram-jet motor with low efficiency at take-off and during flights at low speed, and an auxiliary heat source substantially located in the largest cross-section of said duct and adapted to be set in action when the speed of the aircraft reaches a predetermined value, whereby said duct at least alone propels said aircraft at high speed as a ram-jet motor with high efficiency.

2. In an aircraft, at least one propulsion unit each comprising a pulse-jet motor, an open stream-lined nacelle concentrically surrounding said motor while forming all round the same an annular duct extending in the fore-and-aft direction of said aircraft, means for simultaneously supplying said pulse-jet motor and said duct with compressed air, said duct forming successively an annular divergent-convergent chamber round said pulse-jet motor for increasing the thrust effect of the compressed air passing through said duct by means of the heating induced by the outer wall of said pulse-jet motor and a convergent chamber downstream of said pulse-jet motor for simultaneously expanding the compressed air heated within said duct and the exhaust gases of said motor and increasing the efficiency of the hotter gases by admixture of cooler gases, whereby said duct acts as a ram-jet motor with low efficiency at take-off and during flights at low speed, and an auxiliary heat source substantially located in the largest cross-section of said duct and adapted to be set in action when the speed of the aircraft reaches a predetermined value, whereby said duct at least alone propels said aircraft at high speed as a ram-jet motor with high efficiency.

3. In an aircraft, at least one propulsion unit each comprising a pulse-jet motor, an open stream-lined nacelle concentrically surrounding said motor and projecting on either side thereof while forming all round the same an annular duct extending in the fore-and-aft direction of said aircraft, said duct forming successively a divergent chamber upstream of said pulse-jet motor for simultaneously supplying said motor and said duct with compressed air, an annular divergent-convergent chamber round said pulse-jet motor for increasing the thrust effect of the compressed air passing through said duct by means of the heating induced by the outer wall of said pulse-jet motor and a convergent chamber downstream of said pulse-jet motor for simultaneously expanding the compressed air heated within said duct and the exhaust gases of said motor and increasing the efficiency of the hotter gases by admixture of cooler gases, whereby said duct acts as a ram-jet motor with low efficiency at take-off and during flights at low speed, and an auxiliary heat source substantially located in the largest cross-section of said duct and adapted to be set in action when the speed of the aircraft reaches a predetermined value, whereby said duct at least alone propels said aircraft at high speed as a ram-jet motor with high efficiency.

4. In an aircraft, at least one propulsion unit each comprising a pulse-jet motor, an open stream-lined nacelle concentrically surrounding said motor, while forming all round the same an annular duct extending in the fore-and-aft direction of said aircraft, an air-intake duct opening in a high pressure area of the surface of said aircraft and having increasing cross-sections for merging with said annular duct so that said intake duct supplies simultaneously said pulse-jet motor and said annular duct with compressed air, said duct forming successively an annular divergent-convergent chamber round said pulse-jet motor for increasing the thrust effect of the compressed air passing through said duct by means of the heating induced by the outer wall of said pulse-jet motor and a convergent chamber downstream of said pulse-jet motor for simultaneously expanding the compressed air heated within said duct and the exhaust gases of said motor and increasing the efficiency of the hotter gases by admixture of cooler gases, whereby said duct acts as a ram-jet motor with low efficiency at take-off and during flights at low speed, and an auxiliary heat source substantially located in the largest cross-section of said duct and adapted to be set in action when the speed of the aircraft reaches a predetermined value, whereby said duct at least alone propels said aircraft at high speed as a ram-jet motor with high efficiency.

5. In an aircraft, the combination of a fuselage, a pulse-jet motor located in the rear part of said fuselage, a tunnel-like casing concentrically surrounding said motor for defining an annular duct round said motor, housed in said fuselage and opening at the rear part of said fuselage, an air-intake duct opening at the top of the fuselage and having increasing cross-sections for merging with said casing, so that said intake duct supplies simultaneously said pulse-jet motor and said annular duct with compressed air, said annular duct forming successively an annular divergent-convergent chamber round said pulse-jet motor for increasing the thrust effect of the compressed air passing through said duct by means of the heating induced by the outer wall of said pulse-jet motor and a convergent chamber downstream of said pulse-jet motor for simultaneously expanding the compressed air heated within said duct and the exhaust gases of said motor and increasing the efficiency of the hotter gases by admixture of cooler gases, whereby said duct acts as a ram-jet motor with low efficiency at take-off and during flights at low speed, and an auxiliary heat source substantially located in the largest cross-section of said duct and adapted to be set in action when the speed of the aircraft reaches a predetermined value, whereby said duct at least alone propels said aircraft at high speed as a ram-jet motor with high efficiency.

6. In an aircraft, at least one propulsion unit each comprising a pulse-jet motor, a first air-intake duct opening in a high pressure area of the surface of said aircraft and having increasing cross-sections for merging with said pulse-jet motor with a view to supply the same with compressed air, an open stream-lined nacelle concentrically surrounding said motor, while forming all round the same an annular duct extending in the fore-and-aft direction of said aircraft, a second air-intake duct opening in a high pressure area of the surface of said aircraft and having increasing cross-sections for merging with said annular duct with a view to supply the same with compressed air, the junction of said second air-intake duct with said annular duct being concentric to the junction of said first air-intake duct with said pulse-jet motor, said annular duct forming successively an annular divergent-convergent chamber round said pulse-jet motor for increasing the thrust effect of the compressed air passing through said duct by means of the heating induced by the outer wall of said pulse-jet motor and a convergent chamber downstream of said pulse-jet motor for simultaneously expanding the compressed air heated within said duct and the exhaust gases of said motor and increasing the efficiency of the hotter gases by admixture of cooler gases, whereby said duct acts as a ram-jet motor with low efficiency at take-off and during flights at low speed, and an auxiliary heat source substantially located in the largest cross-section of said duct and adapted to be set in action when the speed of the aircraft reaches a predetermined value, whereby said duct at least alone propels said aircraft at high speed as a ram-jet motor with high efficiency.

7. In an aircraft, the combination of a fuselage, a pulse-jet motor located in the rear part of said fuselage, a tunnel-like casing concentrically surrounding said motor for defining an annular duct round said motor, housed in said fuselage and opening at the rear part of said fuselage, two air-intake ducts respectively opening on either side of said fuselage and having increasing cross-section for respectively merging with said pulse-jet motor and said annular duct with a view to respectively supply the same with compressed air, said annular duct forming successively an annular divergent-convergent chamber round said pulse-jet motor for increasing the thrust effect of the compressed air passing through said duct by means of the heating induced by the outer wall of said pulse-jet motor and a convergent chamber downstream of said pulse-jet motor for simultaneously expanding the compressed air heated within said duct and the exhaust gases of said motor and increasing the efficiency of the hotter gases by admixture of cooler gases, whereby said duct acts as a ram-jet motor with low efficiency at take-off and during flights at low speed, and an auxiliary heat source substantially located in the largest cross-section of said duct and adapted to be set in action when the speed of the aircraft reaches a predetermined value, whereby said duct at least alone propels said aircraft at high speed as a ram-jet motor with high efficiency.

References Cited in the file of this patent

UNITED STATES PATENTS

| Number | Name | Date |
|---|---|---|
| 1,369,672 | Koenig | Feb. 22, 1921 |
| 1,714,416 | Cannistra | May 21, 1929 |
| 1,844,521 | Otwell | Feb. 9, 1932 |
| 1,983,405 | Schmidt | Dec. 4, 1934 |
| 2,074,098 | Adams | Mar. 16, 1937 |
| 2,193,375 | Papritz | Mar. 12, 1940 |
| 2,379,541 | Planiol | July 3, 1945 |
| 2,396,568 | Goddard | Mar. 12, 1946 |
| 2,396,911 | Anxionnaz et al. | Mar. 19, 1946 |
| 2,401,941 | Lee | June 11, 1946 |
| 2,432,359 | Streid | Dec. 9, 1947 |
| 2,441,488 | Howell | May 11, 1948 |
| 2,447,100 | Stalker | Aug. 17, 1948 |
| 2,482,505 | Pierce | Sept. 20, 1949 |
| 2,486,967 | Morrisson | Nov. 1, 1949 |
| 2,509,890 | Stalker | May 30, 1950 |
| 2,612,748 | Tenney et al. | Oct. 7, 1952 |

FOREIGN PATENTS

| Number | Country | Date |
|---|---|---|
| 50,033 | France (Add. to No. 779,655) | Aug. 1, 1939 |
| 439,805 | Great Britain | Dec. 6, 1935 |
| 574,873 | Great Britain | Jan. 24, 1946 |
| 818,703 | France | June 21, 1937 |

OTHER REFERENCES

"Aviation News," issue of February 4, 1946, page 7.